United States Patent [19]

McLeod

[11] Patent Number: 4,646,461
[45] Date of Patent: Mar. 3, 1987

[54] FISHING ROD WITH HEATED HANDLE

[76] Inventor: William D. McLeod, 756 Henry Ruff, Westland, Mich. 48185

[21] Appl. No.: 789,111

[22] Filed: Oct. 18, 1985

[51] Int. Cl.$^4$ .......................... A01K 87/00; A61F 7/08
[52] U.S. Cl. ......................................... 43/23; 126/206
[58] Field of Search .................... 43/23; 126/204, 206, 126/208

[56] References Cited

U.S. PATENT DOCUMENTS

| Re. 24,858 | 8/1960 | Phipps | 43/23 X |
| 692,168 | 1/1902 | Snyder | 126/206 |
| 835,150 | 11/1906 | Bowditch | 126/206 |
| 1,216,070 | 2/1917 | Carlson | 43/23 X |
| 2,816,539 | 12/1957 | Church | 126/208 |
| 2,833,271 | 5/1958 | Barber | 126/208 |
| 2,835,245 | 5/1958 | Morgan | 126/208 |
| 2,997,042 | 8/1961 | Mitchell | 43/23 |
| 3,447,254 | 6/1969 | Sobel et al. | 43/23 X |
| 4,286,571 | 9/1981 | Hung | 126/206 |

*Primary Examiner*—Nicholas P. Godici
*Assistant Examiner*—Carmine Cuda
*Attorney, Agent, or Firm*—Charles W. Chandler

[57] ABSTRACT

A heated handle for a fishing pole, having an aluminum tubular body received in an internal chamber in the handle for containing a dry fuel element. Both the handle and the tubular body have ventilating openings. The tubular body has a lesser diameter than the internal chamber to form an air space about the body which prevents the handle from overheating, but permits the fuel element to burn.

2 Claims, 3 Drawing Figures

U.S. Patent   Mar. 3, 1987   4,646,461
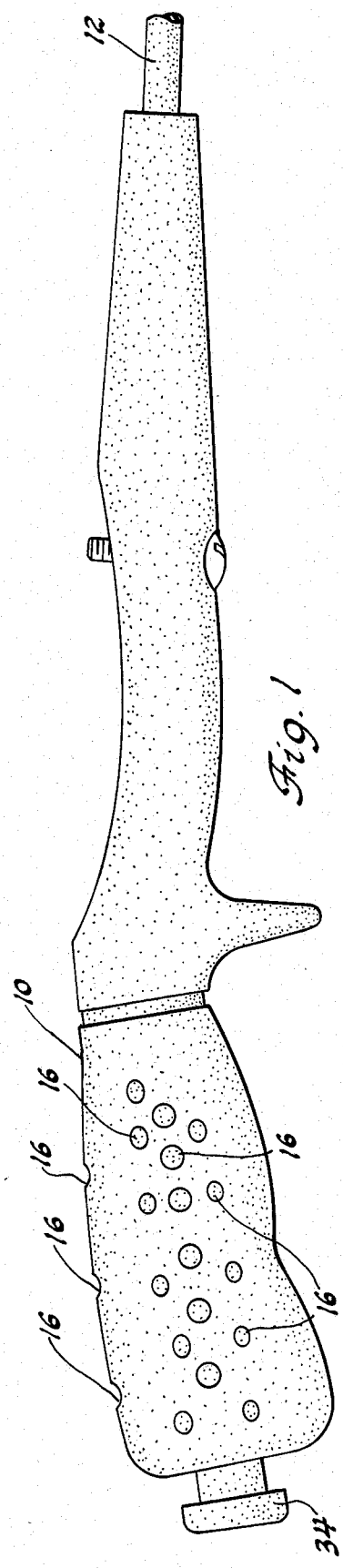
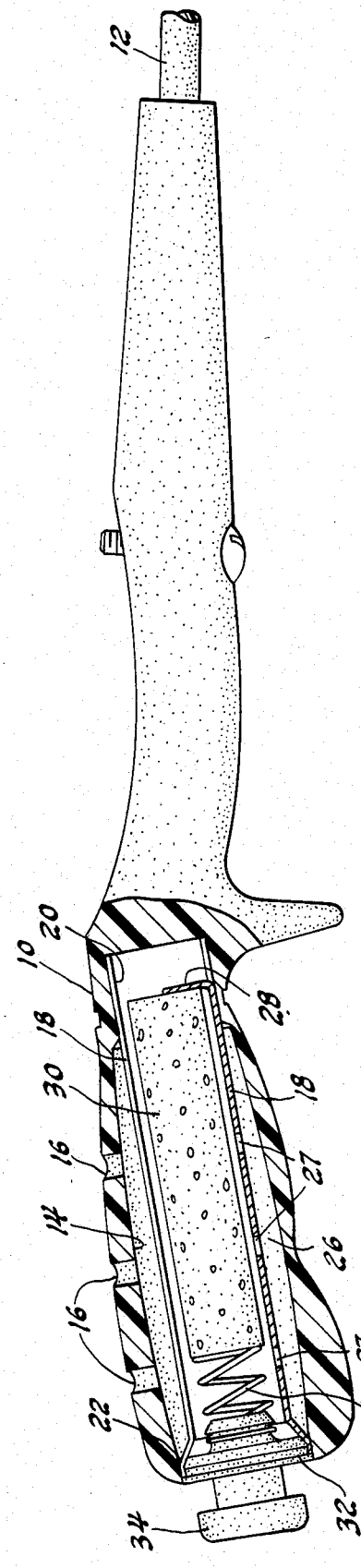
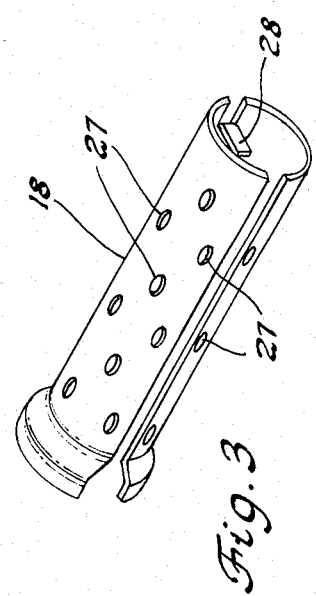

FISHING ROD WITH HEATED HANDLE

BACKGROUND OF THE INVENTION

This invention is related to heated handles for fishing poles, and more particularly to such a handle having a metal tubular body for containing the burning fuel disposed in the handle in such a manner that an air space is formed between the body and the handle to prevent the handle from becoming uncomfortably heated.

Heated fishing pole handles are known in the prior art for cold weather fishing such as for ice fisherman. Usually such devices employ a dry stick of fuel which is ignited, inserted in the handle and which may burn for several hours. Examples of such handles are disclosed in U.S. Pat. No. 3,858,567, which issued Jan. 7, 1975, to Norman D. Slogaski, and U.S. Pat. No. 4,020,825, which issued May 3, 1977, to Federico Fusetti.

A problem with prior art handles is that they tend to become too hot for the user to hold for an extended period of time, and occasionally problems occur in providing sufficient ventilating holes in the handle for the burning fuel element.

SUMMARY OF THE INVENTION

The broad purpose of the present invention is to provide an improved heated handle for a fishing pole in which the handle has a series of ventilating openings along its length which communicate with an internal, elongated chamber. A tubular aluminium body is disposed in the chamber for holding the fuel stick. The tubular body has a lesser diameter than that of the chamber so as to form an air space about the tubular body extending along the chamber. A cap provides means for blocking the fuel-receiving opening in the end of the handle.

The preferred embodiment provides several special advantages such as permitting sufficient air to pass through the handle into the fuel chamber to maintain the fuel stick in a satisfactory burning condition without having a handle that is so hot that it is uncomfortable for the user to hold.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a view of a heated fishing handle illustrated in the preferred embodiment of the invention;

FIG. 2 is a sectional view of the handle of FIG. 1; and

FIG. 3 is a perspective view of the aluminium body which supports the fuel stick.

DESCRIPTION OF THE PREFERRED EMBODIMENT

Referring to the drawing, FIG. 1 illustrates preferred, heated handle 10 adapted to be connected to conventional fishing rod 12 in the usual manner. Handle 10 preferably is formed of a plastic material, and as illustrated in FIG. 2, has an internal, elongated chamber 14. The handle has a plurality of ventilating opening means 16 preferably along both sides as well as the top of the handle communicating with chamber 14. The length of the internal chamber corresponds to the portion necessary to heat the hand of a user grasping the handle.

The opening means are each about $\frac{1}{8}$ inch in diameter and provide ventilation for the chamber.

Aluminium tubular body 18 is disposed in chamber 14. The inner end of the handle is narrowed at 20 to seat the inner end of body 18. The opposite, outer end of the body is enlarged at 22 and seated in the handle to provide a fuel-receiving opening. The arrangement is such that a cylindrical air space 26 is formed along the body adjacent the chamber wall. The distance between the body and the wall provides an air space with a thickness of about $\frac{1}{4}$ inch extending along the major length of the tubular wall. Preferably the wall thickness of the tubular body is about 0.015 inches. This thickness is relatively important since if it is too thick, the body will build-up too much heat, making the handle too hot.

The tube has a plurality of ventilating opening means 27 for permitting air to pass into the tube to supply oxygen to the burning fuel element.

One end of the tubular body is bent-up to form a tab 28 which defines means for locating the inner end of a conventional fuel stick 30, which is ignited to burn in the chamber to provide a source of heat.

Plastic cap 32 is snapped into opening 22 and has a handle 34 for removing the cap. A wire element 36 is carried on the inner end of the cap to provide means for preventing the burning fuel from contacting the cap.

Thus it is to be understood that I have described an improved heated handle for a fishing pole having an air space about the body which forms the burning chamber arranged to provide sufficient air to the fuel element without building-up heat so that the handle becomes uncomfortable for the user.

Having described my invention, I claim:

1. For use with a fishing rod, the combination comprising:
    an elongated stick of dry fuel:
    an elongated hollow handle having a wall defining an elongated internal chamber having a first diameter, the handle having a first end adapted to be connected to the rod, and an opposite end having a fuel-receiving opening in communication with said internal chamber, the handle having a bottom finger grip, first vent holes along a first side thereof extending through said wall along a major length of the handle, second vent holes on the opposite side of the handle extending along a major length thereof, and top ventilating holes;
    an elongated, hollow metal body disposed in the handle internal chamber, the body having a length accommodating the length of the stick of dry fuel; and an open end adjacent the fuel-receiving opening of the handle for receiving the stick of dry fuel into the body to a burning position, the body having an outer surface of less than said first diameter so as to form an air space around the body and between the body and the chamber wall, the body having a plurality of ventilating openings along a length generally corresponding to the length of the stick of dry fuel, the body having means spaced from the open end for locating the end of the stick of dry fuel;
    a cap removably mounted on the handle to close off the fuel-receiving opening; and
    means carried on the cap and extending into the fuel-receiving opening of the handle to prevent the stick of dry fuel from contacting the cap.

2. A combination as defined in claim 1, in which the handle is formed of a plastic material.

* * * * *